(12) United States Patent
Menon

(10) Patent No.: US 7,496,657 B2
(45) Date of Patent: Feb. 24, 2009

(54) METHOD AND SYSTEM FOR DETERMINING A SOURCE OF A VIRTUAL CIRCUIT FAULT

(75) Inventor: Sunil Menon, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1103 days.

(21) Appl. No.: 10/460,307

(22) Filed: Jun. 13, 2003

(65) Prior Publication Data

US 2004/0255022 A1    Dec. 16, 2004

(51) Int. Cl.
*G06F 15/16* (2006.01)
(52) U.S. Cl. .................. 709/224; 709/225; 709/226; 714/4; 714/21; 714/25; 370/242
(58) Field of Classification Search .......... 709/224, 709/225, 226; 714/4, 21, 25; 370/242
See application file for complete search history.

(56) References Cited

U.S. PATENT DOCUMENTS

| | | | |
|---|---|---|---|
| 6,006,016 A * | 12/1999 | Faigon et al. ............. 714/48 |
| 6,038,219 A * | 3/2000 | Mawhinney et al. ......... 370/242 |
| 6,311,288 B1 * | 10/2001 | Heeren et al. ................. 714/4 |
| 6,538,988 B1 | 3/2003 | Natarajan et al. |
| 6,549,533 B1 | 4/2003 | Campbell |
| 6,581,166 B1 * | 6/2003 | Hirst et al. ..................... 714/4 |
| 6,707,820 B1 * | 3/2004 | Arndt et al. ............... 370/395.2 |
| 6,990,609 B2 * | 1/2006 | Wiley et al. ................... 714/25 |
| 7,080,141 B1 * | 7/2006 | Baekelmans et al. ......... 709/224 |
| 7,197,558 B1 * | 3/2007 | Harper et al. ................ 709/224 |
| 2003/0088698 A1 | 5/2003 | Singh et al. |

FOREIGN PATENT DOCUMENTS

WO      92/05485      4/1992

OTHER PUBLICATIONS

UK Search Report dated Oct. 20, 2004 re GB0413006.8.

* cited by examiner

*Primary Examiner*—Jinsong Hu (57) ABSTRACT

A system and method includes receiving an event, for example, from a frame relay network or from a system log. Whether the event designates a virtual circuit fault in at least one of the local network, the service provider network, or the communications link is determined. When the event designates a virtual circuit fault it is distinguished which of the local network, the service provider network, or the communications link is the source of the fault.

36 Claims, 6 Drawing Sheets

| Ack | Corr | Severity | Time | Source | Message |
|---|---|---|---|---|---|
| | 1 | Minor | Jun 04 10:59:48 | c4k1-fa0. cnd.hp.com | Frame Relay: Carrier problem ifIndex=3 ((40,1)) connect to cisco2k1-s( |
| | 1 | Minor | Jun 04 11:22:03 | c4k1-fa0. cnd.hp.com | Frame Relay: PVC Flapping ifIndex=3 ((40,1)) connect to cisco2k1-s0.1 |
| | 4 | Minor | Jun 04 11:25:27 | c4k1-fa0. cnd.hp.com | Frame Relay: Local PVC problem due to LMI failure. ifIndex=3 ((40,1) (2 |
| | 3 | Minor | Jun 04 11:29:49 | c4k1loop.fc.hp.com | Frame Relay: Local PVC problem due to IF down. ifIndex=3 ((40,1) (20 |

4 Alarms - Critical:0  Major:0  Minor:4  Warning:0  Normal:0

METHOD AND SYSTEM FOR DETERMINING A SOURCE OF A VIRTUAL CIRCUIT FAULT

BACKGROUND

Computer networks, such as Local Area Networks (LANs) and Metropolitan Area Networks (MANs) can be complex to operate. Corporations use network management software applications to maintain computer networks. The network management software applications can display the network topology and indicate any failures in the computer network. An example of a network management software application, is the Hewlett-Packard Open View Network Node Manager (NNM) product.

Corporations may employ a service provider to connect networks of remotely located offices. For example, a corporation may have a local network in one city and another local network in another city. The local networks are entirely under the control of the corporation and may be managed by the corporation. The corporation could contract out the connection of these two offices to a service provider. The two local networks can be connected over a virtual circuit, e.g., a private virtual circuit, using a network from a service provider. The service provider network can be a frame relay network or any other type of network. Since the corporation does not own the service provider network, the corporation cannot manage or monitor problems within the virtual circuit that occur in the service provider network.

SUMMARY

A system and method are provided for determining a source of a virtual circuit fault in a virtual circuit of a local network connected to a service provider network via a communications link. An exemplary method includes receiving an event. Whether the event designates a virtual circuit fault in at least one of the local network, the service provider network, or the communications link is determined. When the event designates a virtual circuit fault, it is distinguished which of the local network, the service provider network, or the communications link is the source of the fault. An exemplary machine readable medium includes software for causing a computing device to perform the exemplary method.

In accordance with an exemplary embodiment, a management computer for determining a source of a virtual circuit fault in a virtual circuit of a local network connected to a service provider network via a communications link is provided. The management computer comprises a processor configured to receive an event, determine whether the event designates a virtual circuit fault in at least one of the local network, the service provider network or the communications link, and distinguish, when the event designates a virtual circuit fault, which of the local network, the service provider network, or in the communications link is the source of the virtual circuit fault. The management computer also comprises an output configured to indicate the source of the virtual network fault.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF THE PREFERRED EMBODIMENTS

Figure 1A:
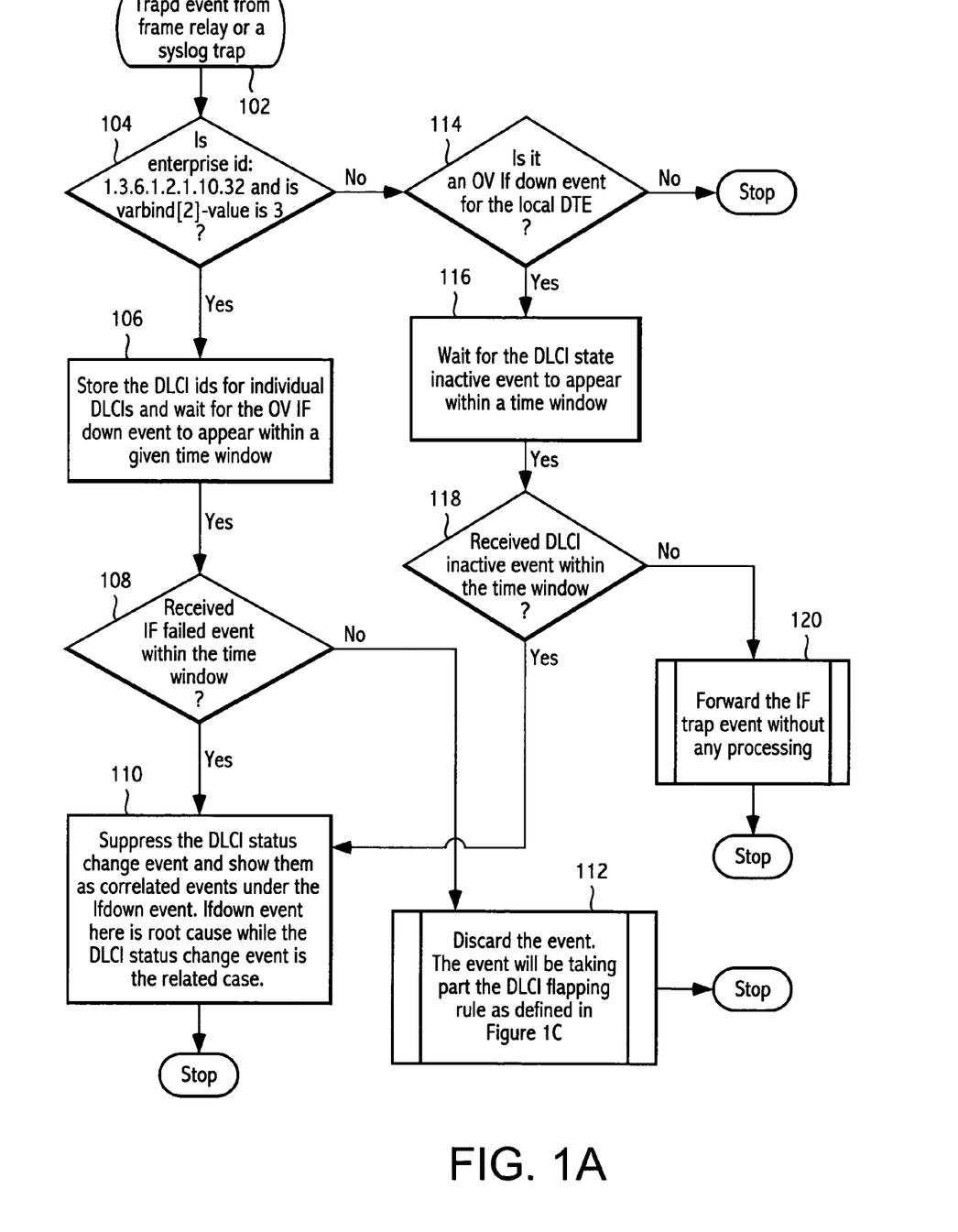
FIGS. 1A-1C are a flowcharts illustrating a method of distinguishing a source of a virtual circuit fault.
Figure 1B:
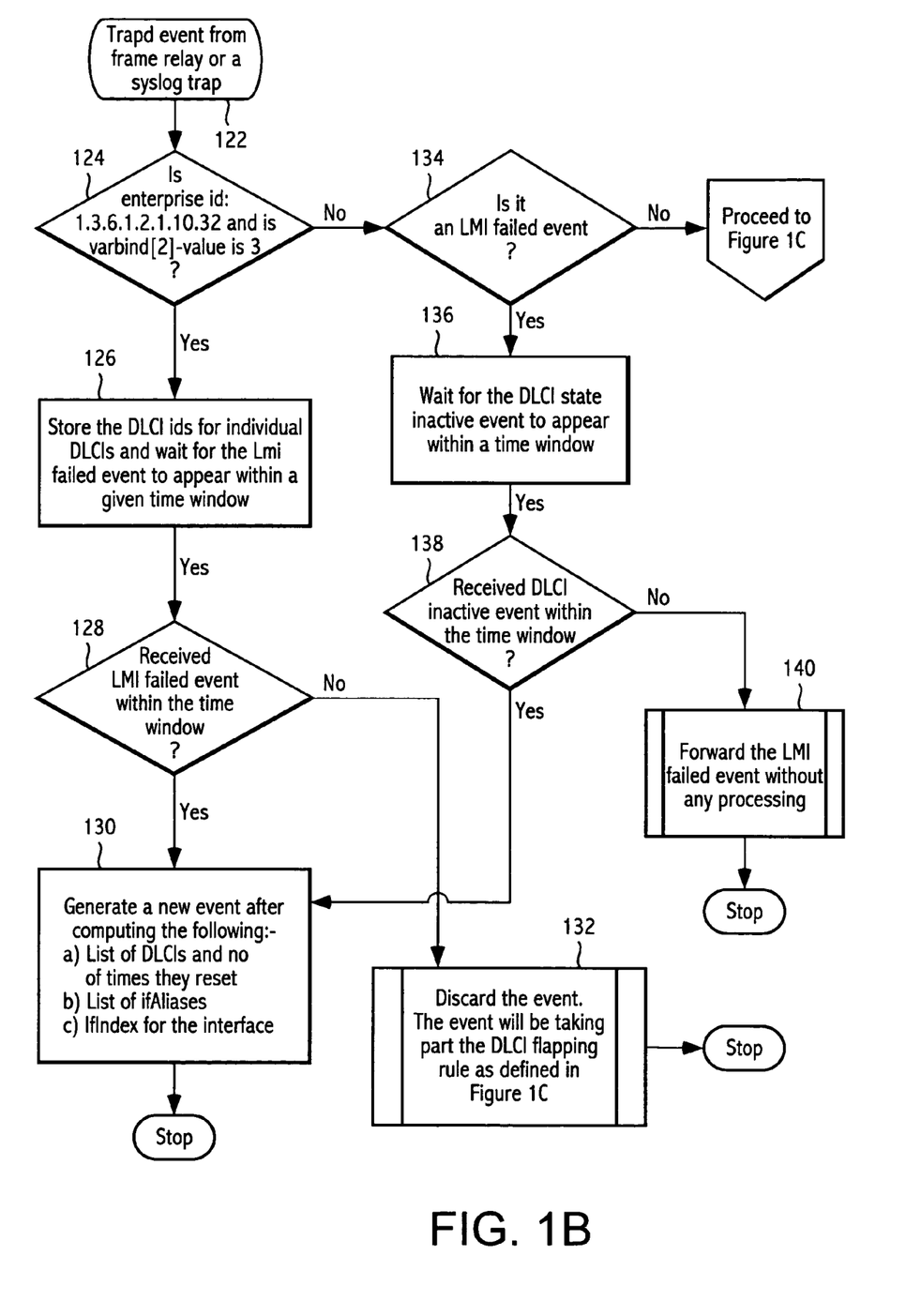
Figure 1C:
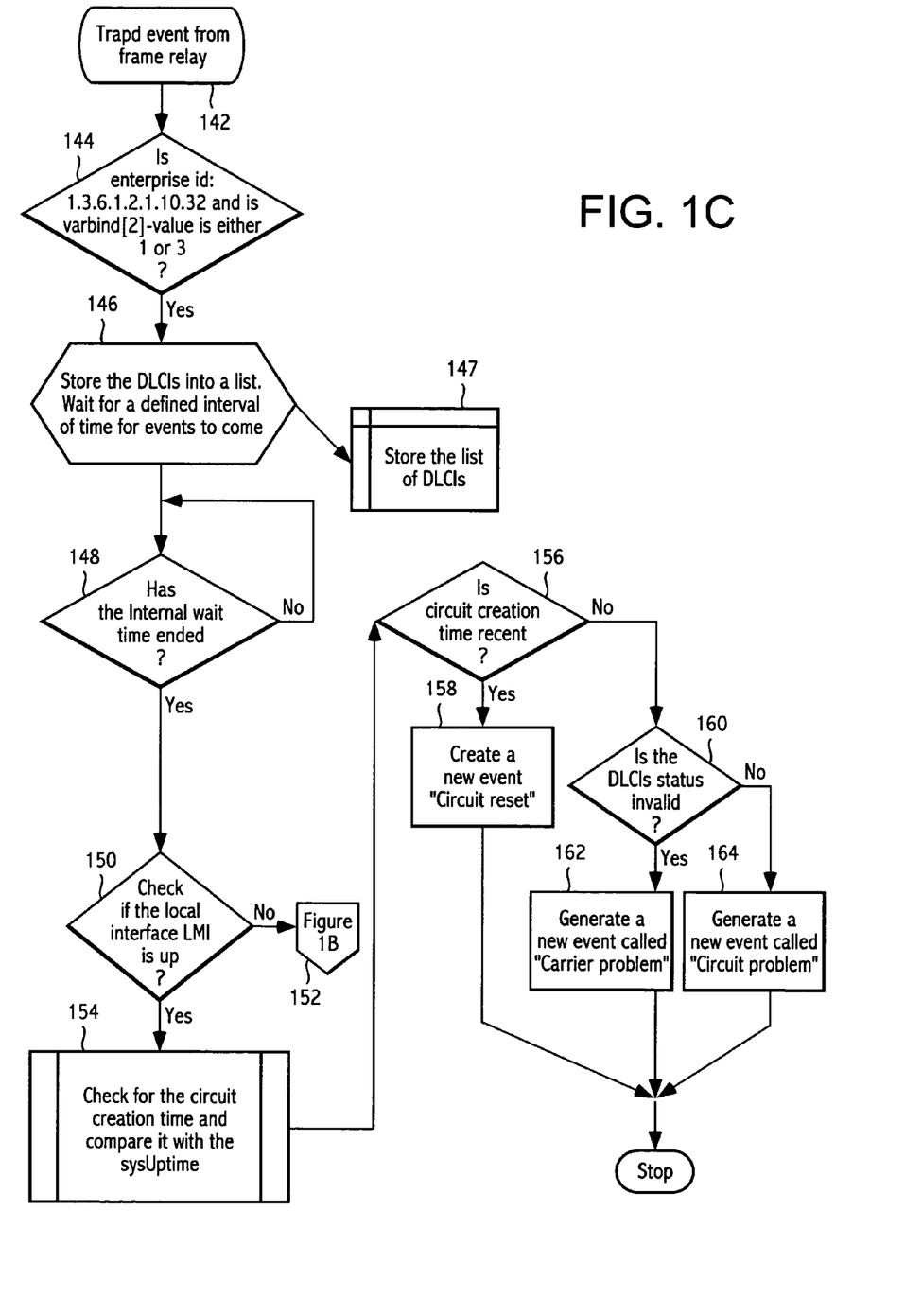

FIGS. 1A-1C are flowcharts illustrating a method of determining a source of a virtual circuit fault in a virtual circuit, e.g., a private virtual circuit, of a local network connected to a service provider network via a communications link. The processes described in FIGS. 1A-1C run in parallel.

In step 102 an event is received. The event can be a trapped event from the frame relay network or a system log (syslog) trap. In step 104 it is determined whether the event designates a virtual circuit fault in at least one of the local network, the service provider network or the communications link. Specifically, it is determined whether the event is a virtual circuit status change event (i.e., a Data Link Connection Identifier (DLCI) status change event) from a frame relay MIB. The enterprise information is used to make this determination. The event can contain an enterprise identification, e.g., enterprise id 1.3.6.1.2.10.32, which is used to determine the network for which the event is associated, and at least an varbind field. There are three varbind fields in the received event: varbind[0] identifies the interface on which the virtual circuit is configured (i.e., the DLCI is configured); varbind[1] identifies the DLCI; and varbind[2] identifies the status of the virtual circuit. The status field can have one of three different values: 1 indicating that the virtual circuit is invalid; 2 indicating that the virtual circuit is active; and 3 indicating that the virtual circuit is inactive.

After receipt of the DLCI status change event, the system waits a predetermined amount of time for an interface down (IFdown) event from the edge router that sent the DLCI status change event. During the wait process any other DLCI status change event originating from other virtual circuits configured on the same interface are also recorded in accordance with step 106.

In step 108 it is determined whether another event is received with the predetermined amount of time with a same virtual circuit identifier as the received event. The predetermined amount of time can be 3 minutes. Specifically, it is determined whether the system received an interface down event for the same interface for which it received a DLCI status change event. If the interface index in the interface down event is the same as that of the DLCI status change event (varbind[0]), then in step 110 it is distinguished that the source of the virtual circuit fault occurs in the local network, and more specifically, that the fault is an interface fault of an edge router of the local network. The received event, i.e., the DLCI status change event, is suppressed and an output is provided of an IFdown event as the cause of the fault and that the DLCI status change event is related to the cause of the fault. If, however, another event with the same virtual circuit identifier is not received within the predetermined amount of time then the received event is discarded by this portion of the processing in accordance with step 112. Since the processes of FIGS. 1B and 1C operate in parallel with the process of FIG. 1A, the received event may be used in the processes of FIGS. 1B and 1C to distinguish that the virtual circuit fault occurs in communications link or in the service provider network.

Returning now to step 104, if the received event does not contain an varbind[2] value of 3, then in step 114 it is determined whether the event is an interface down event for the local router, i.e., the local data terminating equipment (DTE). The interface down event can be an Open View interface down event. If the event is not an interface down event for the local router, then this portion of the processing of the event stops.

If the received event is an interface down event, then in accordance with step 116, the process waits for a predetermined amount of time. In step 118 it is determined whether another event is received which has the same DLCI. Specifically, it is determined whether another event is received with the same DLCI and which includes an varbind[2] value of 3, i.e., inactive. If the another event is received with the same DLCI and which includes an varbind[2] value of 3, then in step 110 it is distinguished that the source of the virtual circuit fault occurs in local network, and more specifically, that the fault is an interface fault of an edge router of the local network. If, however, the another event does not satisfy the criteria of step 118, then the interface down trap event is forwarded to the Open View Network Node Manager without any processing in accordance with step 120.

The pseudocode listed below illustrates an exemplary method by which it is determined whether the source of the virtual circuit fault occurs in the local network:

```
Set the time window to 3 min time interval
  Event = receive( incoming event)
  If ( Event = frame relay event)
  {
    Store the DLCI id
    Store event identifier
  }
  Else if ( Event = IFdown event)
  {
    Check if the Interface is of type frame relay
    If ( found to be frame relay)
    {
        Compute its Index
        Compute its sub-interface id
        Set the common flag
    }
  else discard any other type of event
  check if 3 min time window ended
  if ( yes)
  do the following:-
  {
      a) read the stored DLCI id and compute number of times they
      changed status
      b) compute the remote destinations using the DLCI and if Index
      c) Generate a new event called Local PVC problem due IFdown
      d) Correlate all the frame relay status change event and IFdown event
  underneath the new event called Local PVC problem due to IFdown
```

FIG. 1B illustrates the second process of the three parallel processes. In step 122 an event is received. The event can be a trapped event from the frame relay network or a system log (syslog) trap. In step 124 it is determined whether the event designates a virtual circuit fault in at least one of the local network, the service provider network or the communications link. Specifically, it is determined whether the event is the DLCI status change event from the frame relay MIB by checking the event signature. If it is determined that the event designates a virtual circuit fault by indicating that the virtual circuit is inactive, i.e., an varbind[2] value of 3, then the DLCI Ids for individual DLCIs are stored, and the system waits a predetermined amount of time, e.g., three minutes, to receive another event with the same virtual circuit identifier as the received event in accordance with step 126.

In step 128 it is determined whether another event is received within the predetermined amount of time with a same virtual circuit identifier as the received event. Specifically, it is determined whether another event is a Link Management Interface (LMI) failed event. The LMI is the protocol exchanged between the local network and the service provider network, and the failure of this protocol indicates that the source of the virtual circuit failure occurs on the communications link between the local network and the service provider network. If an LMI failed event is received within the predetermined time window, then it is distinguished that the source of the virtual circuit fault occurs in the communications link. Accordingly, a list of DLCIs and the number of time they were reset, a list of ifAliases, and the IFIndex for the interface are computed and used to generate a new event in accordance with step 130. This new event can be displayed by the Open View Network Node Manager. If, however, another event (i.e., the LMI down event) is not received within the predetermined amount of time then the received event (i.e., the DLCI status change event) is discarded by this portion of the processing in accordance with step 132.

Returning now to step 124, if the received event is not a DLCI status change event, then in step 134 it is determined whether the event is an LMI failed event. If the event is not an LMI failed event, then this portion of the processing of this event stops, but the event may be employed to distinguish another type of virtual circuit fault in accordance with the parallel processing of FIG. 1C.

If the received event is an LMI failed event, then in accordance with step 136, the process waits for a predetermined amount of time, for example 3 minutes. In step 138 it is determined whether another event is received which is a DLCI status change event. Specifically, it is determined whether another event is received with the same DLCI and which includes an varbind[2] value of 3, i.e., inactive. If the another event is received with the same DLCI and which includes an varbind[2] value of 3, then it is distinguished that the source of the virtual circuit fault occurs in the communications link between the local network and the service provider network. Accordingly, in step 130 a list of DLCIs and the number of time they were reset, a list of ifAliases, and the IFIndex for the interface are computed and used to generate a new event. If, however, the another event does not satisfy the criteria of step 138, then the LMI failed event is forwarded to the Open View Network Node Manager without any processing in accordance with step 140.

The pseudocode listed below illustrates an exemplary method by which it is determined whether the source of the virtual circuit fault occurs in the communications link between the local network and the service provider network:

```
Set the time window to 3 min time interval
Event = receive( incoming event)
If ( Event = frame relay event)
{
   Store the DLCI id
   Store event identifier
}
Else if ( Event = LMI down event)
{
    Compute its Index
    Compute its sub-interface id
    Set the common flag
}
else discard any other type of event
check if 3 min time window ended
```

-continued
```
if ( yes)
do the following:-
{
    a) read the stored DLCI id and compute
    number of times they changed status
      b) compute the remote destinations using the DLCI and if Index
      c) Generate a new event called Local PVC problem due LMI down.
      d) Correlate all the frame relay status change trap and LMI down trap
underneath the new event called Local PVC problem due to IF down
```

FIG. 1C illustrates the third process of the three parallel processes. In step 142 an event is received. The event can be from the frame relay network. In step 144 it is determined whether the event designates a virtual circuit fault in at least one of the local network, the service provider network or the communications link. Specifically, it is determined whether the received event is a DLCI status change event. If it is determined that the event designates a virtual circuit fault by indicating that the virtual circuit is invalid, i.e., an varbind[2] value of 1, or is inactive, i.e., an varbind[2] value of 3, then the DLCI Ids for individual DLCIs are stored, and the system waits a predetermined amount of time, for example 3 minutes, to receive other events with the same virtual circuit identifier as the received event in accordance with steps 146 and 147.

After the predetermined wait period has expired in step 148, a check is performed to determine whether the local interface LMI is up, i.e., whether it is active, in accordance with step 150. If the local interface LMI is not up, then the messages are forwarded to the processing described above in connection with FIG. 1B. If, however, the local LMI interface is up it is distinguished that the source of the virtual circuit fault is in the service provider network. Accordingly, a check is performed for the circuit creation time, and the circuit creation time is compared with the system uptime (sysuptime) in accordance with step 154. In step 156 it is determined if the circuit creation time is recent. Recentness can be, for example, within the past 30 minutes. If the circuit creation time is recent, then in step 158 a circuit reset event is created and forwarded to the Open View Network Node Manager for display.

If the circuit creation time is not recent, then in accordance with step 160 it is determined whether the DLCI's status is invalid. If the DLCI's status is invalid, then in accordance with step 162 a carrier problem event is created and forwarded to the Open View Network Node Manager for display. If, however, the DLCI's status is not invalid then in accordance with step 164 a circuit problem event is generated and forwarded to the Open View Network Node Manager for display.

The pseudocode listed below illustrates an exemplary method by which it is determined whether the source of the virtual circuit fault occurs in the service provider network (i.e., a local interface failure):

```
    Set the windown to 3 min time interval
    Event=receive( incoming event)
    If ( event = frame relay event)
    {
        store the DLCI id
    }
    Has the time window ended??
    If ( yes) do the following
    :-
    {
        a)  check the common flag
        b)  if ( set) do nothing and exit
```

-continued
```
        c)  if not set do the following
        d)  {
            i)   check if the PVC creation time has changed
            ii)  if ( yes) generate a PVC reset event
            iii) if ( no) check if the PVC status is invalid
            iv)  If ( yes) generate a carrier problem event
            v)   If ( no) generate a carrier problem event)
            }
        e)  compute the remote destination of DLCI
        f)  compute number of times they changed status
        g)  exit
    }
```

The pseudocode described following the description of FIGS. 1A-1C operate in a similar manner to that described above in connection with FIGS. 1A-1C. However, as illustrated by the pseudocode above, each of the three parallel processes of FIGS. 1A-1C employ a common flag which is set to notify the other two parallel processes that one of the processes has determined that the received event is being handled by that one of the processes.

Figure 2:
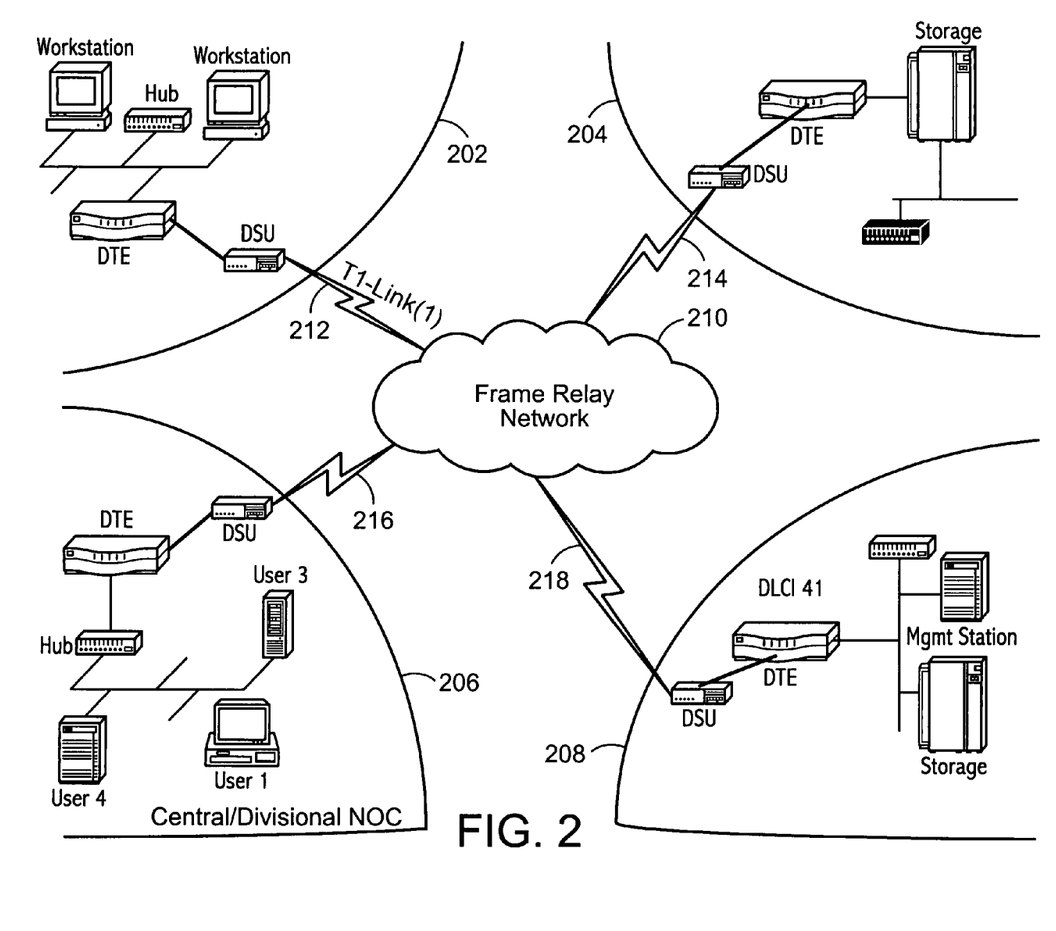
FIG. 2 is a diagram of an exemplary computer network.

FIG. 2 illustrates an exemplary network with a plurality of virtual circuits. In FIG. 2 each local network 202, 204, 206, and 208 contains a digital subscriber unit (DSU) for connecting a Data Terminating Equipment (DTE) to the service provider network 210. The DSU is a serial converter that translates IP data to a serial stream before it enters the service provider network 210. The DSU can be placed between the local network edge router and the service provider network, or the DSU is contained inside the local edge router. The service provider network can be a frame relay network. Each of the local networks are connected via a communications link 212, 214, 216, and 218 to the service provider network 210. The service provider network can be a frame relay network. If the service provider network is another type of network, the present description is equally applicable to those networks, the difference being the type of messages received from the service provider network. The communications links 212, 214, 216, and 218 can be, for example, a T1 communications link.

Figure 3:
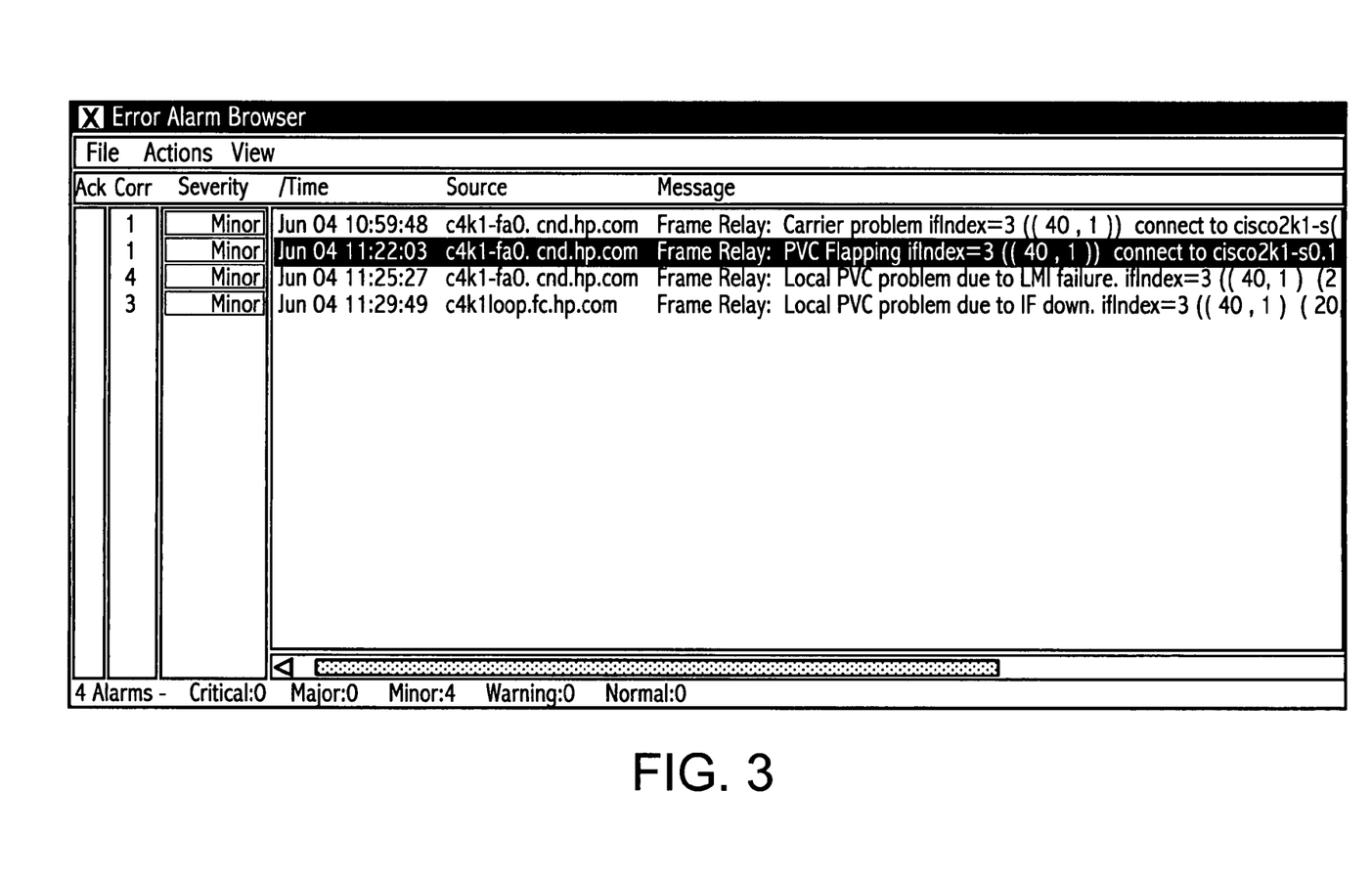
FIG. 3 is a diagram of an exemplary computer network display.

FIG. 3 illustrates an exemplary computer network display. Specifically, the computer network display illustrates the Open View Network Node Manager error alarms browser. As illustrated in FIG. 3, the browser has received a carrier problem indicating that there is a problem with the service provider network; a private virtual circuit flapping problem indicating that there is a physical problem with the communications link between the local network and the service provider network; a local virtual circuit problem indicating that the LMI protocol exchange between the local network and the service provider network has failed; and a local virtual circuit problem indicating that the interface of the edge router of the local network is down.

Various aspects will now be described in connection with exemplary embodiments in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both. Moreover, the exemplary embodiments can be considered part of any form of computer readable storage medium having stored therein an appropriate set of computer instructions that would cause a processor to carry out the techniques described herein.

Thus, the various aspects can be embodied in many different forms, and all such forms are contemplated to be within the scope of what is described. For each of the various aspects, any such form of embodiment can be referred to herein as "logic configured to" perform a described action, or alternatively as "logic that" performs or "logic capable of" performing a described action.

Figure 4:
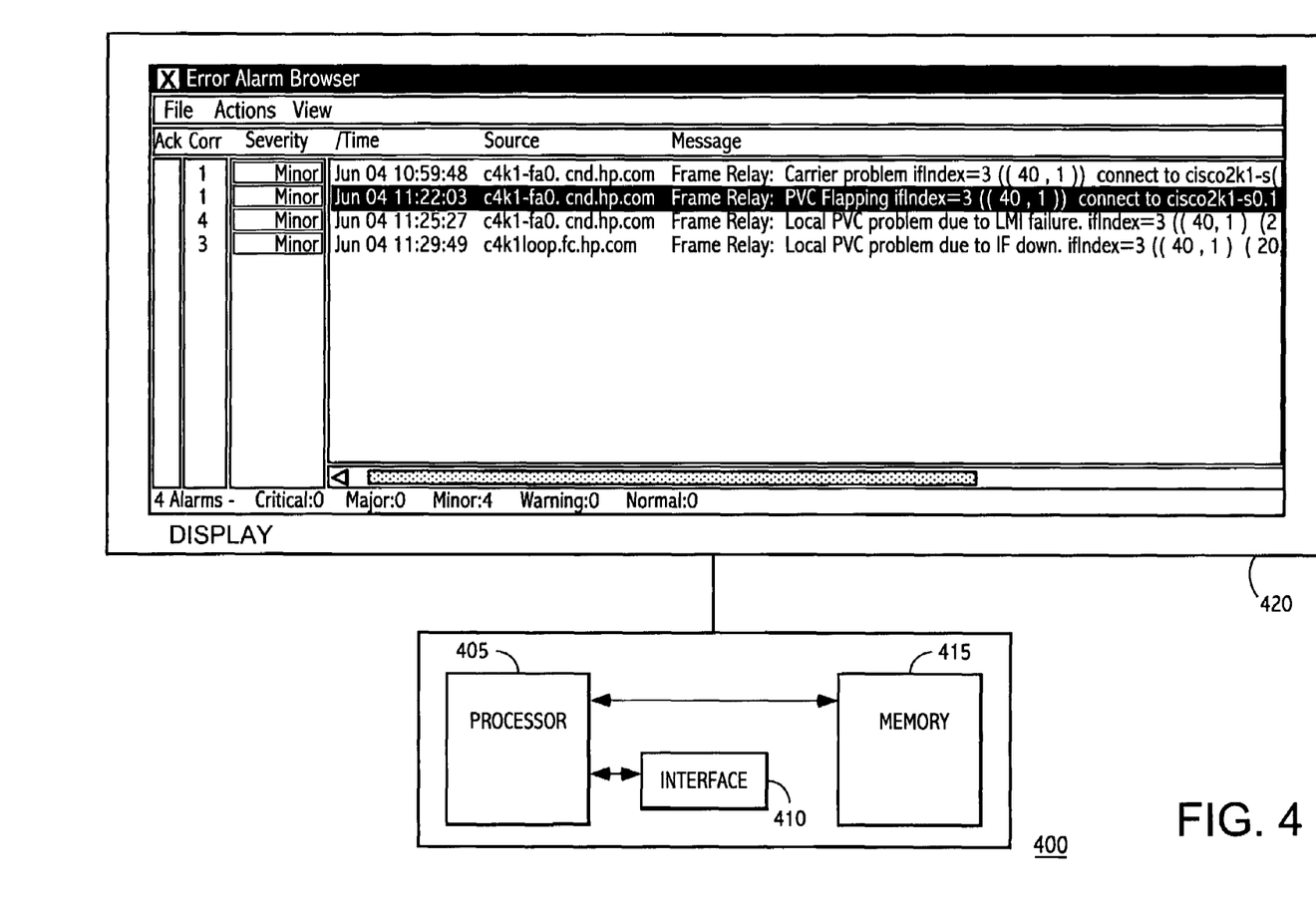
FIG. 4 is a diagram of an exemplary computer implementation.

The system and method for showing the routing protocol areas can be integrated as part of any computer network display system. For example, the system can be integrated into HP Open View Network Node Manager (NNM) version 6.41. FIG. 4 illustrates an exemplary computer for determining a source of a virtual circuit fault in a virtual circuit of a local network connected to a service provider network via a communications link. The computer 400 includes a processor 405 which includes a means for receiving. Processor 405 is configured to receive an event, determine whether the event designates a virtual circuit fault in at least one of the local network, the service provider network or the communications link, and distinguish, when the event designates a virtual circuit fault, which of the local network, the service provider network, or in the communications link is the source of the virtual circuit fault. The computer system 400 also includes a means for indicating, represented, for example, as an interface 410, a memory 415 or a display 420 which is configured to indicate the source of the virtual network fault. The interface 410 can connect a printer, or other output device, to the computer system 400.

The processor 405 can also include a means for determining. Processor 405 is configured to determine when another event is received within a predetermined amount of time with a same virtual circuit identifier as the event. When the event and the another event have the same virtual circuit identifier then it is determined that the virtual circuit fault occurs in at least one of the local network and in the communications link. Additionally, the processor 405 can include a means for determining. Processor 405 is configured to determine that an interface of the local network is active, and to determine that the virtual circuit was created within a predetermined amount of time, and that the virtual circuit fault occurs in the service provider network.

Those skilled in the art will appreciate that software, including instructions for causing a computing device or system to perform the methods or processes described herein, can be stored on a machine-readable medium. For example, the software can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used herein, a "computer readable medium" can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, device, or storage medium. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for determining a source of a virtual circuit fault in a virtual circuit of a local network connected to a service provider network via a communications link, the method comprising:
   receiving an event;
   determining whether the event designates a virtual circuit fault in at least one of the local network, the service provider network, or the communications link;
   when the event designates a virtual circuit fault, determining whether another event is received within a predetermined amount of time with a same virtual circuit identifier as the event; and
   determining, when the another event is received within the predetermined amount of time with the same virtual circuit identifier as the event, that the virtual circuit fault occurs in at least one of the local network and the communications link.

2. The method of claim 1, wherein when the another event is an interface event then it is determined that the virtual circuit fault occurs in the local network.

3. The method of claim 2, wherein the fault occurs on an interface of a router connected to the communications link.

4. The method of claim 1, wherein when the another event is a link event then it is determined that the virtual circuit fault occurs in the communications link.

5. A method for determining a source of a virtual circuit fault in a virtual circuit of a local network connected to a service provider network via a communications link, the method comprising:
   receiving an event;
   determining whether the event designates a virtual circuit fault in at least one of the local network, the service provider network, or the communications link;
   determining that an interface of the local network is active; and
   determining that the virtual circuit was created within a predetermined amount of time, and that the virtual circuit fault occurs in the service provider network.

6. The method of claim 5, wherein when the virtual circuit was created within a predetermined amount of time, the method comprising:
   indicating that the virtual circuit fault is due to a reset of the virtual circuit.

7. The method of claim 5, wherein when the virtual circuit was not created within a predetermined amount of time, the method comprising:
   determining whether the event indicates that a status of the virtual circuit is inactive or invalid.

8. The method of claim 7, wherein when the event indicates that the status of the virtual circuit is invalid, then it is determined that the fault occurs in the service provider network.

9. The method of claim 7, wherein when the event indicates that the status of the virtual circuit is inactive, then it is determined that the fault occurs in the communications link.

10. A system for determining a source of a virtual circuit fault in a virtual circuit of a local network connected to a service provider network via a communications link, the system comprising:

means for receiving an event, and determining whether the event designates a virtual circuit fault in at least one of the local network, the service provider network or the communications link;

means for indicating the source of the virtual network fault; and means for determining, when another event is received within a predetermined amount of time with a same virtual circuit identifier as the event, that the virtual circuit fault occurs in at least one of the local network and in the communications link.

11. The system of claim 10, wherein when the another event is an interface event then it is determined that the virtual circuit fault occurs in the local network.

12. The system of claim 11, wherein the fault occurs on an interface of a router connected to the communications link.

13. The system of claim 10, wherein when the another event is a link event then it is determined that the virtual circuit fault occurs in the communications link.

14. A system for determining a source of a virtual circuit fault in a virtual circuit of a local network connected to a service provider network via a communications link, the system comprising:

means for receiving an event, and determining whether the event designates a virtual circuit fault in at least one of the local network, the service provider network or the communications link;

means for indicating the source of the virtual network fault; and means for determining that an interface of the local network is active, and determines that the virtual circuit was created within a predetermined amount of time, and that the virtual circuit fault occurs in the service provider network.

15. The system of claim 14, wherein when the virtual circuit was created within a predetermined amount of time, the output indicates that the virtual circuit fault is due to a reset of the virtual circuit.

16. The system of claim 14, wherein when the virtual circuit was not created within a predetermined amount of time, the means for distinguishing determines whether the event indicates that a status of the virtual circuit is inactive or invalid.

17. The system of claim 16, wherein when the event indicates that the status of the virtual circuit is invalid, then the means for distinguishing determines that the fault occurs in the service provider network.

18. The system of claim 16, wherein when the event indicates that the status of the virtual circuit is inactive, then the means for distinguishing determines that the fault occurs in the communications link.

19. A management computer for determining a source of a virtual circuit fault in a virtual circuit of a local network connected to a service provider network via a communications link, the management computer comprising:

a processor configured to receive an event, and determine whether the event designates a virtual circuit fault in at least one of the local network, the service provider network or the communications link; and an output configured to indicate the source of the virtual network fault wherein the processor is configured to determine, when another event is received within a predetermined amount of time with a same virtual circuit identifier as the event, that the virtual circuit fault occurs in at least one of the local network and in the communications link.

20. The management computer of claim 19, wherein when the another event is an interface event then it is determined that the virtual circuit fault occurs in the local network.

21. The management computer of claim 20, wherein the fault occurs on an interface of a router connected to the communications link.

22. The management computer of claim 19, wherein when the another event is a link event then it is determined that the virtual circuit fault occurs in the communications link.

23. A management computer for determining a source of a virtual circuit fault in a virtual circuit of a local network connected to a service provider network via a communications link, the management computer comprising:

a processor configured to receive an event, and determine whether the event designates a virtual circuit fault in at least one of the local network, the service provider network or the communications link; and an output configured to indicate the source of the virtual network fault;

wherein the processor is configured to determine that an interface of the local network is active, and to determine that the virtual circuit was created within a predetermined amount of time, and that the virtual circuit fault occurs in the service provider network.

24. The management computer of claim 23, wherein when the virtual circuit was created within a predetermined amount of time, the output indicates that the virtual circuit fault is due to a reset of the virtual circuit.

25. The management computer of claim 23, wherein when the virtual circuit was not created within a predetermined amount of time, the processor determines whether the event indicates that a status of the virtual circuit is inactive or invalid.

26. The management computer of claim 25, wherein when the event indicates that the status of the virtual circuit is invalid, then the processor determines that the fault occurs in the service provider network.

27. The management computer of claim 25, wherein when the event indicates that the status of the virtual circuit is inactive, then the processor determines that the fault occurs in the communications link.

28. A computer readable storage medium for storing a computer program for determining a source of a virtual circuit fault in a virtual circuit of a local network connected to a service provider network via communications link, the method comprising:

receiving an event; determining whether the event designates a virtual circuit fault in at least one of the local network, the service provider network, or the communications link;

determining, when the event designates a virtual circuit fault, whether another event is received within a predetermined amount of time with a same virtual circuit identifier as the event; and determining, when the another event is received within the predetermined amount of time with the same virtual circuit identifier as the event, that the virtual circuit fault occurs in at least one of the local network and the communications link.

29. The method of claim 28, wherein when the another event is an interface event then it is determined that the virtual circuit fault occurs in the local network.

30. The method of claim 29, wherein the fault occurs on an interface of a router connected to the communications link.

31. The method of claim 28, wherein when the another event is a link event then it is determined that the virtual circuit fault occurs in the communications link.

32. A computer readable storage medium for storing a computer program for determining a source of a virtual circuit fault in a virtual circuit of a local network connected to a service provider network via communications link, the method comprising:
   receiving an event; determining whether the event designates a virtual circuit fault in at least one of the local network, the service provider network, or the communications link;
   determining that an interface of the local network is active; and
   determining that the virtual circuit was created within a predetermined amount of time, and that the virtual circuit fault occurs in the service provider network.

33. The method of claim 32, wherein when the virtual circuit was created within a predetermined amount of time, the method comprising:
   indicating that the virtual circuit fault is due to a reset of the virtual circuit.

34. The method of claim 32, wherein when the virtual circuit was not created within a predetermined amount of time, the method comprising:
   determining whether the event indicates that a status of the virtual circuit is inactive or invalid.

35. The method of claim 34, wherein when the event indicates that the status of the virtual circuit is invalid, then it is determined that the fault occurs in the service provider network.

36. The method of claim 34, wherein when the event indicates that the status of the virtual circuit is inactive, then it is determined that the fault occurs in the communications link.

* * * * *